July 17, 1956  F. D. TORRENT  2,754,549
MACHINES FOR MANUFACTURING COTTON TIPPED APPLICATORS
Filed June 7, 1947  6 Sheets-Sheet 1

INVENTOR
FREDERICK D. TORRENT
BY R. J. Richardson
ATTORNEY

July 17, 1956 F. D. TORRENT 2,754,549
MACHINES FOR MANUFACTURING COTTON TIPPED APPLICATORS
Filed June 7, 1947 6 Sheets-Sheet 5

INVENTOR
FREDERICK D. TORRENT
BY
R. J. Richardson
ATTORNEY

July 17, 1956  F. D. TORRENT  2,754,549
MACHINES FOR MANUFACTURING COTTON TIPPED APPLICATORS
Filed June 7, 1947  6 Sheets-Sheet 6

INVENTOR
FREDERICK D. TORRENT
BY
*R. J. Richardson*
ATTORNEY

United States Patent Office 2,754,549
Patented July 17, 1956

2,754,549

MACHINES FOR MANUFACTURING COTTON TIPPED APPLICATORS

Frederick D. Torrent, Whitewater, Wis.

Application June 7, 1947, Serial No. 754,967

22 Claims. (Cl. 19—149)

The present invention relates in general to machines for the manufacture of cotton tipped applicators, sometimes referred to as medical swabs, and the object of the invention is a new and improved machine of this character.

Cotton tipped applicators, or medical swabs, are usually made from round wooden sticks about 3/32 of an inch in diameter and cotton supplied in the form of a loose, fluffy ribbon known as coiler cotton. The function of the machine is to manufacture applicators from these materials, the operation involving the separation of short lengths of cotton from the coiler cotton ribbon and wrapping each such length around a stick at the end thereof to form an applicator or swab.

Describing the machine briefly, it includes a stick magazine capable of holding a large number of sticks, a stick conveyor, and mechanism by means of which the sticks are taken from the magazine and delivered to the conveyor one at a time. The conveyor is continuously driven and all the operations involved in forming a swab of cotton on a stick are performed while the stick is moving through the machine on the conveyor.

During the movement of a stick through the machine, it first passes a station where it is given a coating of adhesive. Just beyond this point is the cotton feeding station, where the cotton feeding mechanism is located. This mechanism, operated in timed relation to the movement of the conveyor, separates a short length of cotton from the coiler cotton ribbon and projects it into the path of the moving stick. The next station, extending for some distance along the path of the conveyor, includes a shaper to which the length of cotton is delivered by the stick, and mechanism for imparting rotation to the stick, whereby the cotton is wrapped around the stick as it moves along the shaper in sliding or wiping engagement therewith. The swab thus formed is wet with starch water and the wiping cooperation between the swab and shaper causes the loose fibers to be plastered down, which prevents the swab from unraveling and gives it a finished appearance.

The invention and various features thereof will be described more in detail hereinafter with reference to the accompanying drawings, in which—

Figure 1:
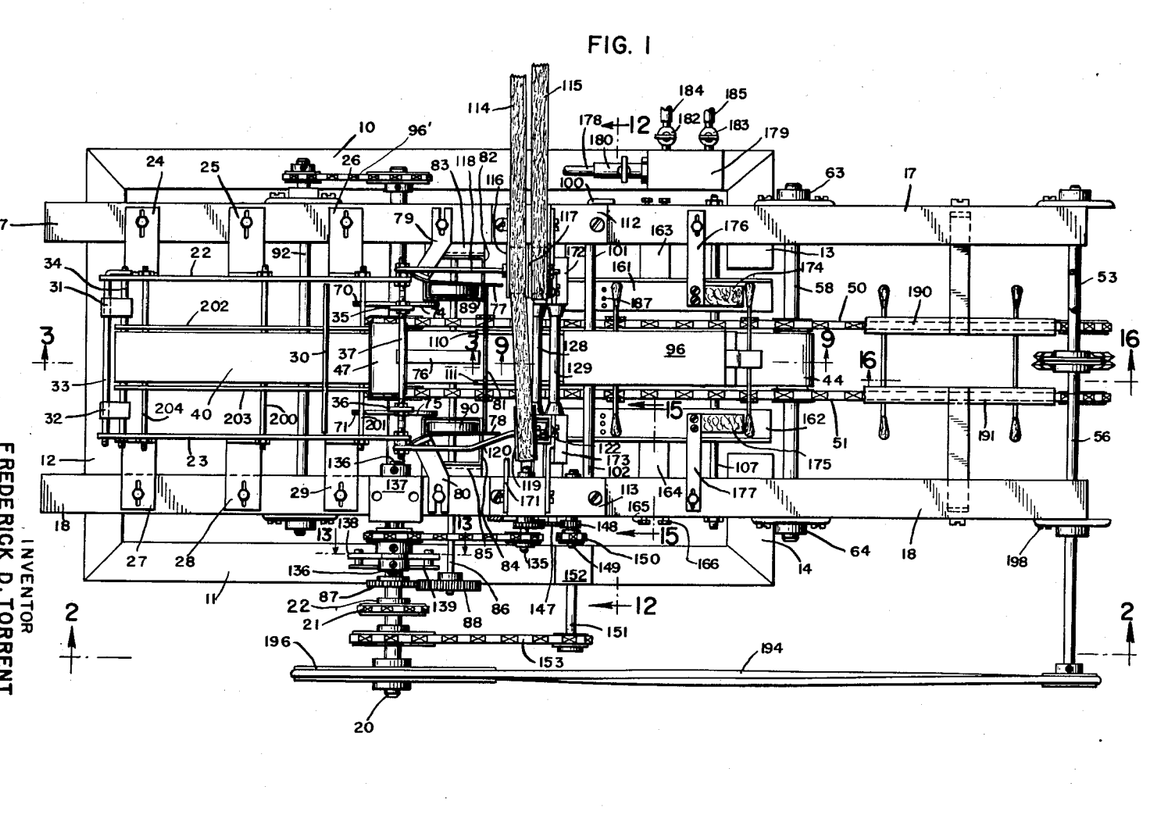
Fig. 1 is a top or plan view of the machine.

Referring to the drawings, the various parts of the machine are supported on a frame which may be constructed of suitable steel angle and channel members connecter by welding. As seen in Fig. 1, there are two side angle members 10 and 11, an end angle member 12 which connects the side members 10 and 11, and two short angle members 13 and 14 extending inward from the side members 10 and 11, respectively. These parts form a rectangular frame, which is supported on four legs such as 15 and 16, Fig. 2. The legs may be cross braced and secured to the floor in any suitable manner. The frame also includes two horizontally disposed channel members 17 and 18 which rest on and are secured to the end angle members 12, 13, and 14.

The reference character 20 indicates the main shaft, which drives all the moving parts of the machine by various connections which will be described as the concerned parts are considered. The shaft 20 has suitable bearings inside the channels 17 and 18 and may be driven by a suitable motor (not shown) through the medium of a chain 21 and sprocket wheel 22 fixed to the shaft. The speed of the shaft is preferably about 120 revolutions per minute. Since the motor runs at a much higher speed, it is necessary to employ a suitable speed reducing connection between the motor and shaft, as will be understood.

Figures 2, 6, 7, 8:
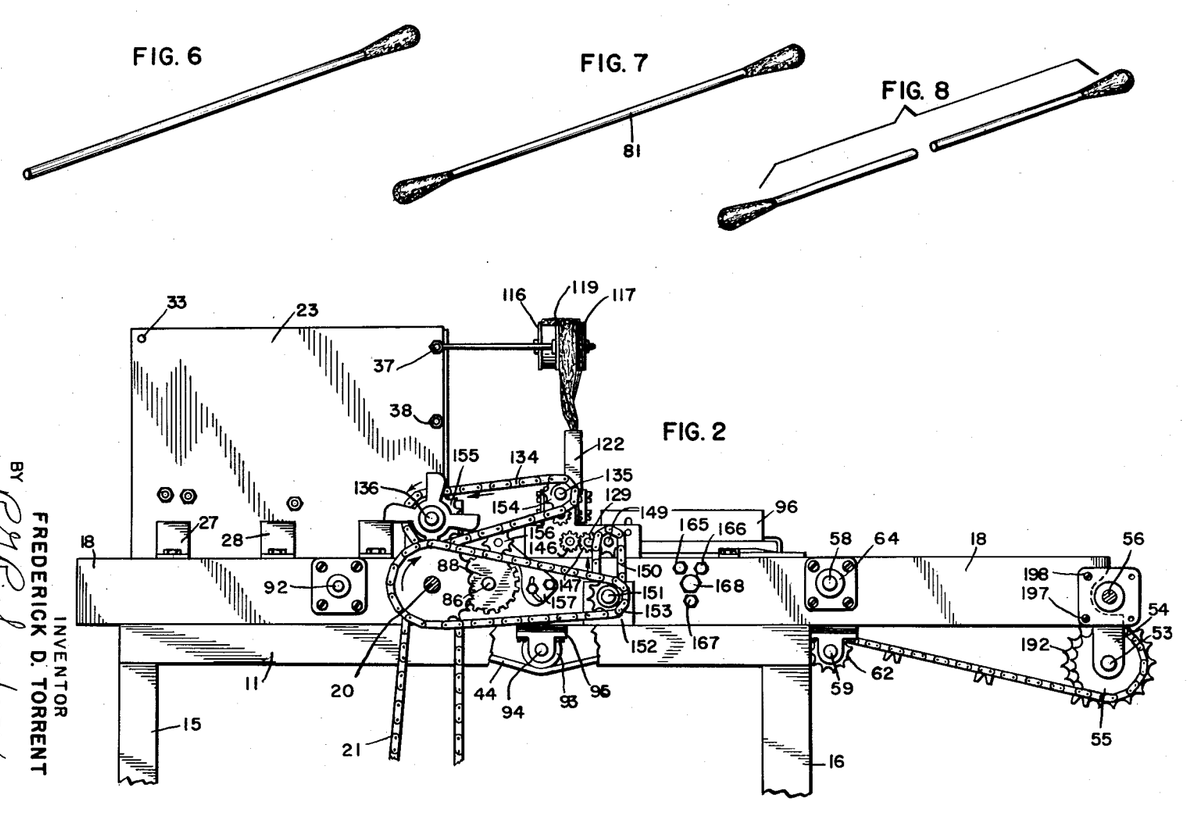
Fig. 2 is a side view, or a section on the line 2—2, Fig. 1.
Fig. 6 shows a cotton tipped applicator as manufactured on the machine.
Fig. 7 shows a stick having a cotton tip or swab formed at both ends.
Fig. 8 shows the same stick as shown in Fig. 7 after being severed at the middle to form two applicators.
Figures 3, 4, 5:
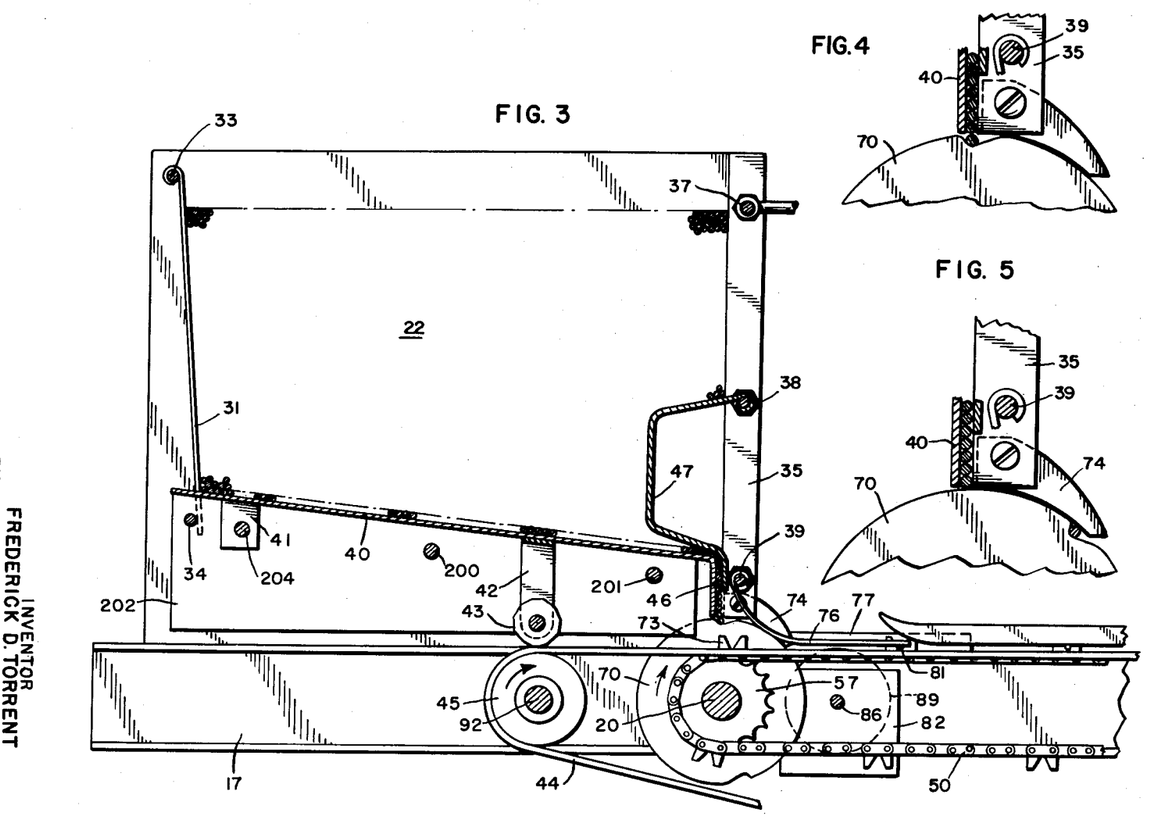
Fig. 3 is a section through the stick magazine on the line 3—3, Fig. 1.
Figs. 4 and 5 show one of the stick feeding wheels in two different positions.

The stick magazine is shown in Figs. 1, 2, and 3. The sides of the magazine are the two vertical metal plates 22 and 23. The plate 22 has attached thereto, preferably by spot welding, the three L-shaped brackets 24, 25, and 26 by means of which it is supported on the frame member 17. The plate 23 is similarly supported on the frame member 18 by means of the three brackets 27, 28, and 29. These brackets are slotted as shown, so that the side plates 22 and 23 can be adjusted for sticks of different length. The magazine is shown empty in Fig. 1, except for the stick 30, so as not to obscure the parts. The left hand end of the magazine is formed by two metal strips 31 and 32, which are supported on the cross rod 33 and extend downward to the right of the cross rod 34. These parts are shown clearly in Figs. 1 and 3. The right hand end of the magazine is formed by two vertical metal bars 35 and 36, which are supported on the cross rods 37, 38, and 39. These cross rods, as well as the others shown, extend between the side plates 22 and 23.

The bottom of the magazine comprises the two plates 202 and 203, which are supported on the cross rods 34, 204, 200, and 201. The sticks rest partly on the edges of plates 202 and 203 and partly on the metal plate 40, which is pivotally supported at the left by means of the bracket 41 and the cross rod 204. Near the other end the plate 40 is supported by means of the bracket 42 and the wheel 43, the latter resting on the belt 44 just above the pulley 45. During the operation of the machine, the wheel 43 is rotated by the belt and since its periphery is not round but has a plurality of flat surfaces, the bottom plate 40 is given a vibratory movement which urges the sticks to the right and forms them into a vertical column as indicated at 46, Fig. 3. This operation is assisted by the guide member 47, which is a metal plate formed as shown and supported on the cross rod 38.

Figure 16:
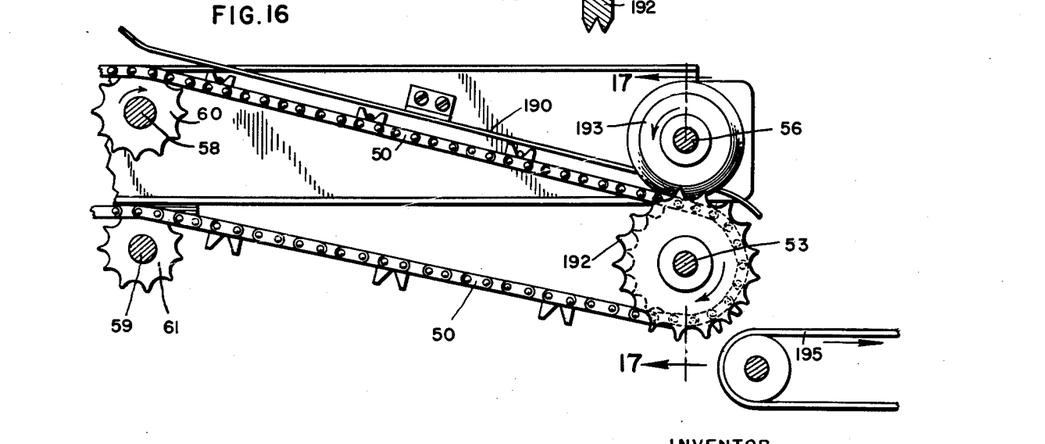
Fig. 16 is a partial section on the line 16—16, Fig. 1, showing the stick cutter.

The stick conveyor comprises two chains 50 and 51, which extend between two sprocket wheels on the main shaft 20 and two sprocket wheels on the shaft 53. Both pairs of sprockets are fixed to their respective shafts. One of the sprockets on the main shaft, the one which drives the chain 50, is indicated at 57, Fig. 3, while one of the sprockets on shaft 53 is indicated at 55, Fig. 2. The conveyor chains extend horizontally to the right from the sprockets on the main shaft as far as the shaft 58, where they pass over two idler sprockets, one of which is indicated at 60, Fig. 16. After leaving the idler sprockets on shaft 58, the chains pass at a downward angle to the sprockets on shaft 53 and then return to the sprockets on the main shaft by way of two idler sprockets on shaft 59. One of these latter sprockets is indicated at 61, Fig. 16, and the other at 62, Fig. 2. They may be loose on shaft 59, which is mounted on the lower side of the frame members 17 and 18 as indicated in Fig. 2 and is adjustable up and down to adjust the tension in the chains.

The shaft 58 is rotatably mounted in bearings 63 and 64 on the frame members 17 and 18. In addition to the two idler sprockets the shaft carries a pulley 65 for the belt 44. The shaft 53 has bearings in hangers such as 54, which extend downwardly from the frame members 17 and 18 at the right hand ends thereof.

Figures 12, 13, 14:
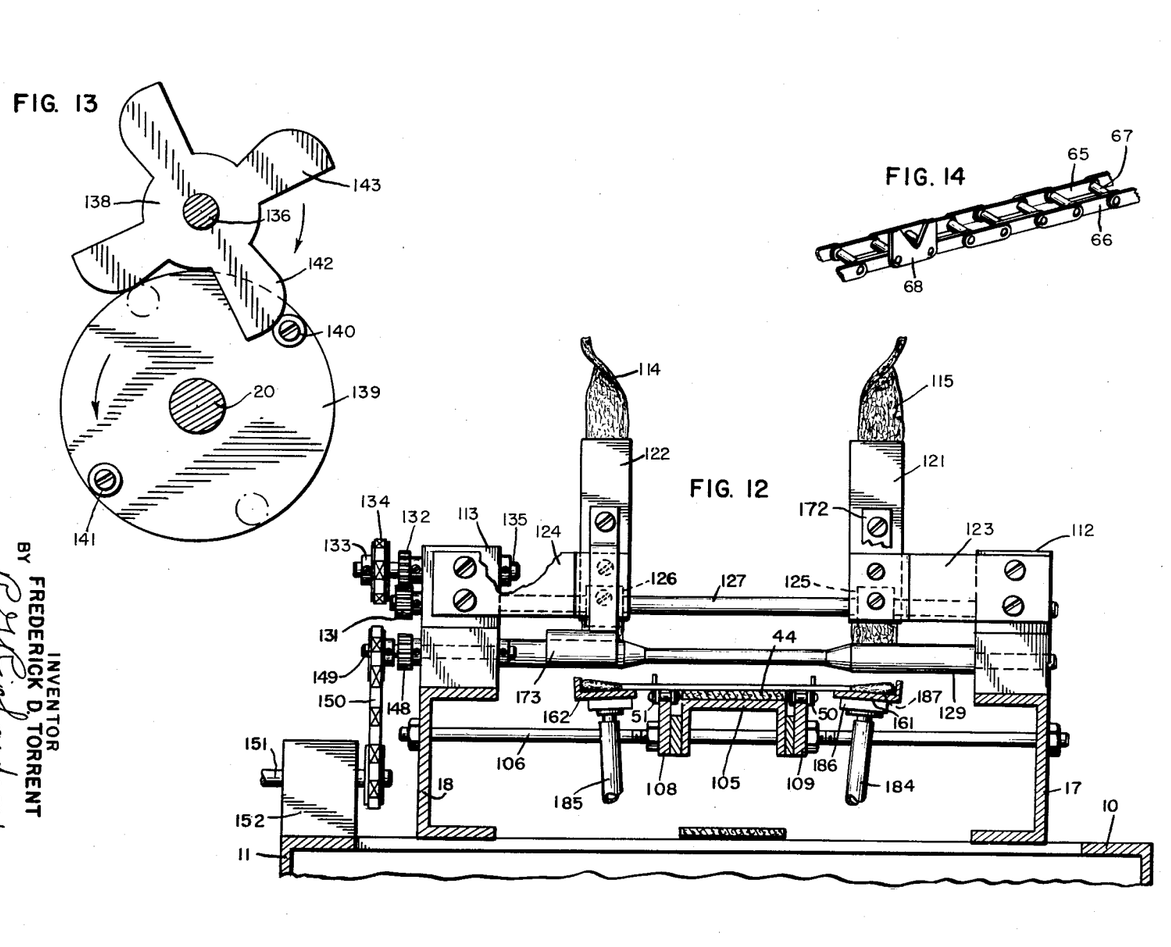
Fig. 12 is a section on the line 12—12, Fig. 1.
Fig. 13 shows the Geneva movement for operating the cotton feed mechanism.
Fig. 14 is a perspective view of a section of conveyor chain.

The construction of the conveyor chains will be clear from Fig. 14, which shows a short section of chain 51. Each link comprises two short spaced bars such as 65 and 66 and adjacent links are pivotally connected by means of cross pins such as 67. This is a well known type of chain. In order to adapt the chain to function as a stick conveyor certain of the outside bars are formed as indicated at 68, being made wider than the other bars and having a V-shaped notch in the part which extends upward from the chain. These links may be referred to as conveyor links and are preferably one-eighth as numerous as the common links. That is, every eighth link is a conveyor link. The drive sprockets such as 57 on the main shaft each has 16 teeth, so that two conveyor links pass any given point along the path of the conveyor chains for each rotation of the main shaft.

The stick feed mechanism, by means of which the sticks are fed from the magazine to the conveyor chains, may now be explained, reference being had to Figs. 1 and 3 to 5, inclusive. This mechanism comprises two notched discs 70 and 71 which are mounted on the main shaft 20. Each disc has two notches which are 180 degrees apart, as shown clearly in the case of disc 70, Fig. 3, and the notches in disc 71 are of course aligned with those in disc 70. The discs are rotated by the main shaft in the direction of the arrow, Fig. 3. In the operation of the machine, when a notch on disc 70 and the corresponding notch on disc 71 pass the column of sticks 46, the lowermost stick drops into the notches and is carried along to the right and is deposited in conveyor links such as 73 in the conveyor chains 50 and 51. In order to insure the retention of the stick in the notches after it passes beyond the vertical bars 35 and 36 and until it arrives at the conveyor chains, two guides 74 and 75 are provided and are secured to the bars 35 and 36, respectively. These guides are directly above the discs 70 and 71 and cooperate therewith to transfer the sticks from the magazine to the conveyor chains. It will be understood that the discs 70 and 71 are so oriented with respect to the conveyor links passing over the sprockets on the main shaft that each time a stick approaches the lower ends of the guides 74 and 75 a pair of conveyor links will be in the proper position to receive the stick and carry it along to the right out of the notches in the discs and past the ends of the guides. A curved metal strip 76, pivotally mounted on the cross rod 39, rests lightly on the sticks as they start their movement on the conveyor chains and obviates any danger of their bouncing out of the notches in the conveyor links.

As the sticks are extracted from the column 46 one at a time the column descends and is replenished from above, due to the vibratory movement of the bottom member 40. The feed is intermittent and takes place only when the notches in the discs pass the column of sticks, as shown in Fig. 4. At other times the column is supported on the periphery of the discs as illustrated in Fig. 5.

Just to the right of the stick feed mechanism are two resilient metal guides 77 and 78 which are adjustably supported on the frame members 17 and 18 by means of the two brackets 79 and 80. The guides 77 and 78 are engaged by the ends of each stick such as 81 as it is carried along by the conveyor chains and align it properly transversely of the machine. These guides are useful because the width of the magazine is somewhat greater than the length of the sticks and as a result some of the sticks will be longitudinally displaced to the right or left as they are delivered to the conveyor chains.

Beneath the guide 77 there is a container 82 for a liquid adhesive and there is a similar container 84 beneath the guide 78. These containers are supported on the frame members 17 and 18 by brackets 83 and 85, respectively. The shaft 86 has bearings in the frame members 17 and 18 and extends through the containers 82 and 84, where it is provided with the adhesive applying wheels 89 and 90. The shaft 86 is rotated from the main shaft by gears 87 and 88. The wheels 89 and 90 dip into the liquid adhesive in their respective containers, which wets the wheels, and the wheels are thus adapted to apply some adhesive to each stick as it passes by. This will be clear from Fig. 3, which shows wheel 89 and its elevation with respect to the sticks as they are carried along by the conveyor chains.

The arrangement for imparting a spinning motion to the sticks as they are moved along by the conveyor chains includes the belt 44, which extends between the pulley 45 on shaft 92 and the pulley 65 on shaft 58. The tension in the belt is adjusted by means of an idler pulley 93, shown in Fig. 2, which is carried on a shaft 94. This shaft is mounted on the frame members 17 and 18 by supports such as 95, which can be raised or lowered by means of shims. The shaft 92 is driven from the main shaft 20 by the chain 96', shown in Fig. 1.

It will be noted that the drive connections for the belt are such that the surface speed of the belt is greater than that of the conveyor chain 50. In fact it is twice that of the conveyor so as to co-operate with the fixed surface of friction material 98 to rotate the sticks.

Figures 9, 10, 11:
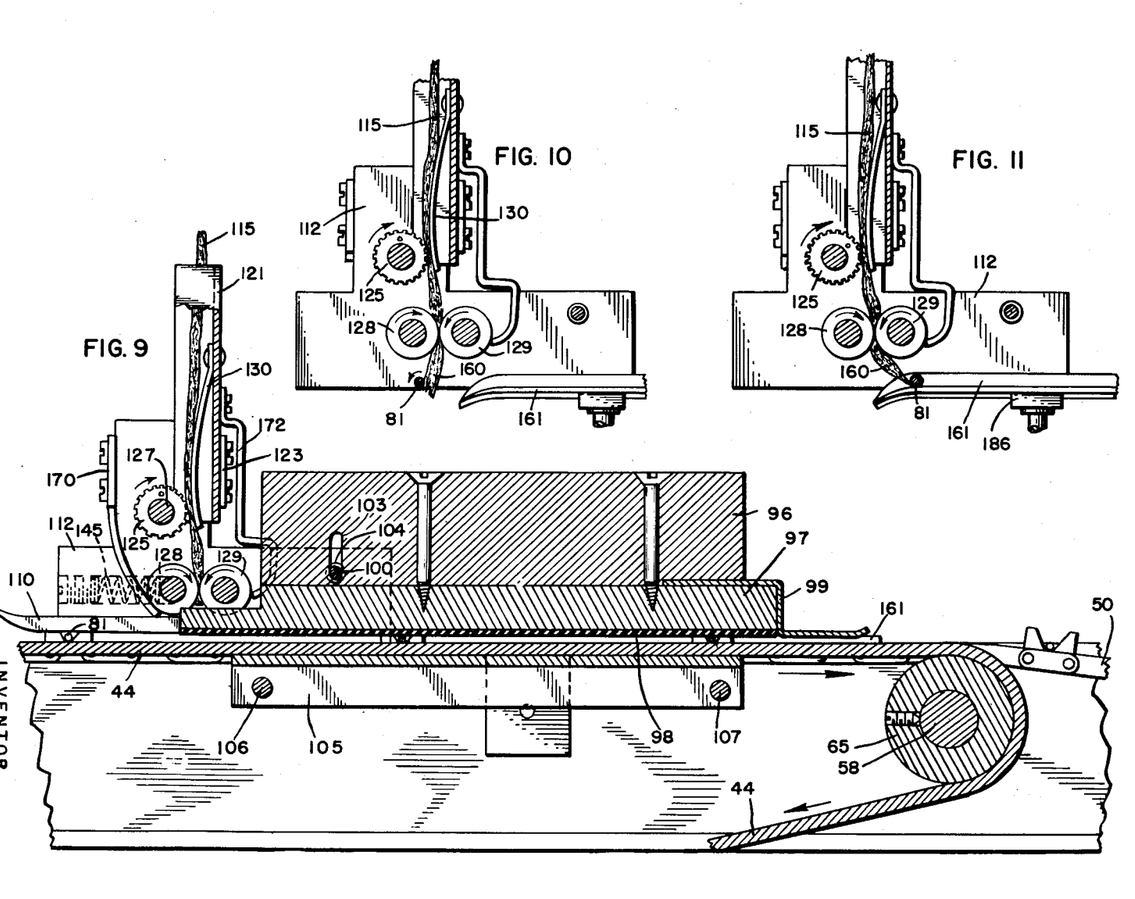
Fig. 9 is a section on the line 9—9, Fig. 1, showing the cotton feed mechanism and associated parts.
Figs. 10 and 11 are partial sections on the same line as Fig. 9 and show the cotton feed mechanism in different stages of operation.

The sticks are pressed against the belt 44 by the weight 96 which may be of some metal such as brass. As shown in Fig. 9, the weight 96 is attached to a base 97, made preferably of wood, which has a layer 98 on the bottom composed of some good friction material such as rubber, secured thereto by a suitable cement. The weight 96 is held against movement in the direction of belt and conveyor movement, indicated by the arrows, by means of a cross rod 100 which passes through a hole in the pillow block 112 and a vertical slot in weight 96 and is threaded into a tapped hole in the pillow block 113. The tubular spacers 101 and 102 serve to prevent lateral displacement of the weight.

Beneath the weight 96 the belt 44 is supported by the channel member 105, seen in Figs. 9 and 12, which in turn is supported on the two cross rods 106 and 107. These rods pass through holes in frame members 17 and 18. Also supported on the rods 106 and 107 are the two bars 108 and 109, Fig. 12, which support the conveyor chains 51 and 50, respectively, and prevent any vibration which might otherwise take place.

The sticks are guided underneath the base 97 and its friction layer 98 by two forwardly extending runners 110 and 111 which are secured to the sides of the base 97 and slightly overlap the guide 76, as seen in Fig. 1. The runner 110 is shown in Fig. 9. When a stick reaches the friction layer 98, as it is carried along by the conveyor chains it starts to spin on its own axis, due to its engagement with the moving belt 44 beneath and the stationary friction layer 98 above, pressed down by the weight 96, and the spinning motion continues until the stick passes out from beneath the base and its friction layer at the right. At this point a resilient metal guide 99 is provided to prevent the stick from being dislodged from the conveyor chains by any final flip that may be imparted to it.

The mechanism for feeding cotton to the sticks may now be described. As may be noted from Fig. 1, which shows a number of sticks in progress through the machine, the sticks have swabs formed on both ends. There are, therefore, two feed mechanisms, although certain parts are common to both.

The coiler cotton may be supplied in bags or other containers which rest on the floor to the right of the machine as seen from the right in Fig. 1. From these containers the ribbons 114 and 115 pass upward and over two spools (not shown) whereby they are directed horizontally to the spools 116 and 117. These spools are rotatably mounted on the rod 118, which is secured to one end of the cross rod 37 as shown. After leaving the spool 117 the ribbon 115 passes downward and into the feed chute 121, located beneath the spool and shown in Fig. 9. The ribbon 114 extends across the machine from spool 116 to the spool 119 and then passes downward to the feed chute 122. Spool 119 is rotatably mounted on rod 120 which is secured to the other end of cross rod 37.

The feed chute 122 is shown in Fig. 2 and both feed chutes are shown in Fig. 12. The latter figure shows how the chutes are supported on the pillow blocks 112 and 113 by the brackets 123 and 124.

The construction of the feed chutes will be readily understood from the showing of chute 121, Fig. 9. Made from heavy sheet metal, the chute 121 is of U-shaped cross-section, and the sides of the chute guide the ribbon 115 of coiler cotton down between the spring 130 and the cog wheel 125. This wheel is mounted on a shaft 127, which has bearings in the pillow blocks 112 and 113. The spring 130 is tensioned so as to press the ribbon 115 against the cog wheel 125, from which it will be understood that rotation of the cog wheel in the direction of the arrow is effective to feed the ribbon downward toward the feed rollers 128 and 129.

The shaft 127 on which cog wheel 125 and a corresponding cog wheel 126 in chute 122 are mounted is driven from the counter shaft 135, see Fig. 12, by means of the gears 131 and 132. The shaft 135 is rotatably mounted in the pillow block 113 and is driven from the shaft 136 by means of sprocket wheels 154 and 155 and chain 134, as best shown in Figs. 1 and 2. The shaft 136 is rotatably mounted on the pillow block 137 and is driven intermittently from the main shaft 20 by the Geneva movement comprising the four spoked wheel 138 and the disc 139.

The Geneva movement is shown on an enlarged scale in Fig. 13. The disc 139 is mounted on the main shaft 20 and carries two rollers 140 and 141. As the disc 139 rotates in the direction of the arrow the roller 140 engages the spoke 142 of the wheel 138 and rotates the wheel one quarter turn or 90 degrees. This movement of wheel 138 takes place while the disc 139 is rotating somewhat less than 90 degrees. The wheel 138 then stops and remains stationary until the disc 139 completes 180 degrees of rotation whereupon the roller 141 engages the spoke 143 and rotates the wheel 138 another quarter turn.

It will be understood from the foregoing that the shaft 127 and cog wheels 125 and 126 are rotated intermittently, alternately advancing to feed the ribbons 114 and 115 downward and stopping to interrupt the feed.

The amount of cotton fed at each advance depends on the ratio of the number of teeth in sprocket wheel 154, Fig. 2, to the number of teeth in sprocket wheel 155, and is adjustable by exchanging the sprocket wheel 154 for one having a greater or lesser number of teeth. An idler sprocket 156 and an adjustable support 157 are provided by means of which the chain 134 can be accommodated to sprocket wheels of different size.

The feed rollers 128 and 129 are rotatably mounted in the pillow blocks 112 and 113. The bearings for the roller 128 are arranged so as to permit a small degree of movement of the roller away from roller 129 against the pressure of compression springs such as 145, Fig. 9, which normally hold roller 128 in contact with roller 129.

The roller 129 drives roller 128 by means of gears 146 and 147, Fig. 2, and is itself driven by gears 147 and 148 from the counter shaft 149, Figs. 1 and 12, which is rotatably mounted on the pillow block 113. The shaft 149 is driven from shaft 151 by means of the chain 150. The shaft 151 has a bearing 152 supported on frame member 11 and is driven from the main shaft 20 by the chain 153.

The feed rollers 128 and 129 rotate in the direction of the arrows as seen in Fig. 9. As the ribbons of coiler cotton 114 and 115 are fed downward by the cog wheels 125 and 126 the ends of the ribbons are seized by the rollers and a downward pull is exerted on the ribbons which is effective, when the rotation of the cog wheels is interrupted, to break off a short length of cotton from each ribbon. These short lengths are then fed downward by the feed rollers into the path of a stick which is approaching on the conveyor chains. Fig. 10 shows the position of the parts just after the cog wheel 125 has stopped rotating, causing the length of cotton 160 to be broken or torn off from the ribbon 115 by the feed rollers 128 and 129.

The short lengths or masses of cotton which are torn off from the ribbons 114 and 115 as described in the foregoing are wrapped around the stick with the aid of the stick spinning mechanism and two shapers 161 and 162, seen in Figs. 1 and 12. The shaper 161 is also partly shown in Figs. 10 and 11. These shapers are of generally L-shaped cross-section and extend parallel to and just outside the conveyor chains 50 and 51 from a point below the feed roller 129 to a point somewhat to the left of shaft 58. The ends of the shapers which are adjacent roller 129 have a curved formation, as seen in the case of shaper 161, Fig. 10.

The shapers are mounted on the frame members 17 and 18 by means of the two brackets 163 and 164, respectively. The mountings provide for adjustment, as may be explained in connection with Fig. 15, which shows the mounting for the shaper 162 and its supporting bracket 164.

Figures 15, 17:
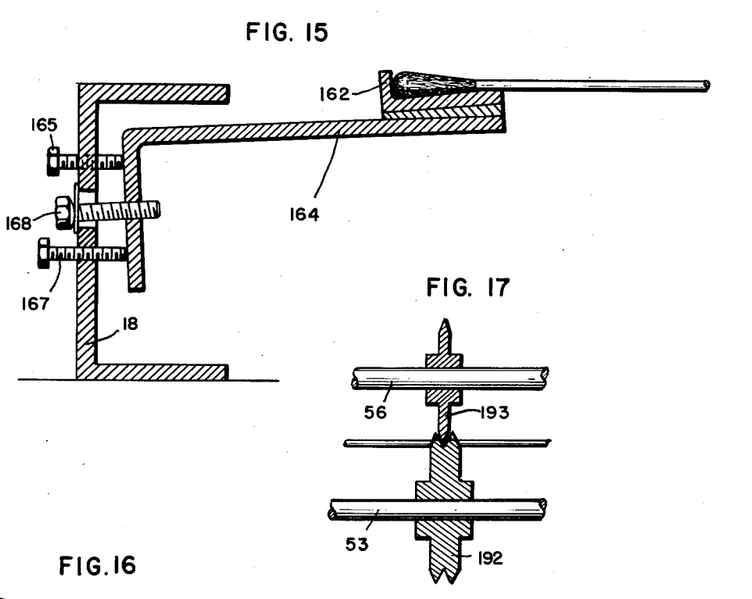
Fig. 15 is a partial section on the line 15—15, Fig. 1, showing the arrangement for adjusting the shaper.
Fig. 17 is a partial section through the stick cutter on the line 17—17, Fig. 16.

There are three set screws 165, 166 and 167, which extend through tapped holes in frame member 18. Screws 165 and 167 appear in Fig. 15 and the screw 166 can be seen in Figs. 1 and 2. The bracket 164 is held against the ends of the three screws by the bolt 168, which passes through a vertical slot in frame member 18 and is threaded into a tapped hole in the bracket. It will be seen that this arrangement provides for various adjustments of the shaper 162. For example, the shaper can be adjusted for proper elevation by loosening bolt 168 and raising or lowering the bracket 164, such movement being permitted by the slot in the frame member 18 in which bolt 168 is located. Lateral adjustment for sticks of different length can be accomplished by loosening bolt 168 and then turning the set screws in or out, after which the bolt 168 is again tightened up. Finally, the shaper can be rotated or tilted on its longitudinal axis by backing off screws 165 and 166 and by turning in screw 167, for example, to adapt the shaper to the manufacture of larger swabs, that is, swabs which include a greater quantity of cotton. The drawing Fig. 15 shows a swab of medium size. For large swabs the shaper is tilted somewhat more than shown, while for smaller swabs it is tilted less. Needless to say the tilting adjustment last described involves raising or lowering of the shaper, and makes it necessary to readjust it for the correct elevation with respect to the belt 44 and conveyor chains 50 and 51.

The foregoing applies also to the shaper 161, which is mounted on the frame member 17 in the same way.

The reference characters 174 and 175, Fig. 1, indicate strips of flexible material such as leather or suitable fabric which are supported on the frame members 17 and 18 by means of the metal strips 176 and 177, respectively. The strips 174 and 175 rest lightly on the swabs as they pass along and cooperate with the shapers 161 and 162 in finishing them.

The pipe 178, Fig. 1, comes from a tank or other suitable container (not shown) containing starch water and leads to the junction box 179 by way of the shut off valve 180. From the box 179 the starch water is distributed to the shapers 161 and 162 by way of the valves 182 and 183 and hoses 184 and 185. These hoses are broken off in Fig. 1 and also in Fig. 12 which shows the ends which are attached to the shapers. The hose 184 connects with a short cylindrical member 186 which may be soldered to the lower side of shaper 161. A plurality of small openings 187 are drilled through the shaper to communicate with the interior of member 186. The hose 185 is conected to shaper 162 and the openings therein in the same way.

The valves 182 and 183 are adjusted to supply just enough starch water to the shapers to keep them wet in the vicinity of the small openings 187, that is, sufficient to dampen the swabs as they pass by. When the machine is stopped or shut down the supply of starch water is shut off at valve 180. This valve makes it possible to shut off and restart the flow of starch without disturbing the adjustment of valves 182 and 183.

The reference characters 170 and 171 indicate guards for the feed roller 128, which are attached to the pillow blocks 112 and 113, respectively. The guard 171 is broken away in Fig. 1, but guard 170 can be seen in Fig. 9. These guards are provided to obviate any danger of a droplet of adhesive being thrown on to the roller by a spinning stick.

Guards 172 and 173, Figs. 1, 9, and 12 are supported on the feed chutes 121 and 122 and are provided to protect the roller 129 from being sprayed with starch water by spinning sticks having no swabs formed thereon. This could happen if the machine should run out of cotton.

The edges of the guards contact the rollers so that they are also effective to scrape off particles of lint which might otherwise adhere to the rollers and interfere with the operation.

There are also two guards 190 and 191 which are supported on the frame members 17 and 18 as indicated in Fig. 1. Like the guards previously described, the guards 190 and 191 are not strictly necessary to the operation of the machine, but are provided to avoid any danger of the sticks becoming dislodged from the conveyor chains. To this end the guards 190 and 191 are located just above the conveyor chains 50 and 51, respectively, as shown in the case of guard 190 in Fig. 16.

The mechanism for severing the sticks as they pass out of the machine comprises a grooved and toothed supporting wheel 192, mounted on shaft 53, and a cutter wheel 193 which is mounted on the shaft 56. The latter shaft is driven from the main shaft 20 by means of the belt 194, as shown in Fig. 1. The arrangement of the wheel 192 and the cutter wheel 193 is shown clearly in Figs. 16 and 17. As a stick with swabs formed thereon reaches nearly to the end of the conveyor it is delivered into a notch in the wheel 192 and is cut in two as it passes beneath the cutter wheel 193, thus forming two swabs or applicators. The wheel 192 and the conveyor chains deliver the severed applicators to the conveyor belt 195.

It is thought that the operation of the machine will be fairly clear from the description of the various parts already given but it may be described briefly nevertheless. For this purpose it may be assumed that the stick magazine has been filled with sticks, and that the ribbons of coiler cotton 114 and 115 have been started into the feed chutes 121 and 122. This can be done by hand, turning the machine over slowly by means of the large pulley 196 on the main shaft 20, until the ends of the ribbons have passed down beyond the cog wheels 125 and 126. The operator should also see to it that the containers 82 and 84 have a supply of liquid adhesive and that the starch water valves 182 and 183 are properly adjusted. The main valve 180 should not be opened, however, until the machine is started.

When the power is turned on the main shaft 20 is rotated in a clockwise direction, as seen in Fig. 2, by means of chain 21 and drives all the moving parts of the machine in the manner previously described. Reviewing these operations briefly, the conveyor chains 50 and 51 are driven directly from the main shaft 20 by sprocket wheels such as 57 on the shaft, the shaft 86 carrying the adhesive applying wheels is driven by gears 87 and 88, and the feed rollers 128 and 129 are driven by chains 153 and 150. The belt 44 is driven by the pulley 45 on shaft 92, which is coupled to shaft 20 by chain 96', while the shaft 127 carrying the cog wheels 125 and 126 is intermittently driven from shaft 20 by means of the Geneva movement, shaft 136, chain 134, and gears 132 and 131.

The sticks in the magazine rest partly on the bottom member 40, which is given a vibratory movement by the roller 43 as soon as the belt 44 starts running. The vibration of member 40 agitates the sticks and feeds them into a column 46 at the lower right hand corner of the magazine from which they are extracted one at a time by the notched discs 70 and 71 on the main shaft and delivered to the conveyor chains 50 and 51. Two sticks are delivered to the conveyor chains upon each rotation of the main shaft.

The operation can best be described from here on by considering an individual stick such as stick 81, which is shown in Fig. 1 about half way between the magazine and the feed rollers 128 and 129.

Prior to reaching this position, and almost immediately after the stick 81 is delivered to the conveyor chains, the ends of the stick engage the adhesive applying wheels 89 and 90, which are rotating in a counterclockwise direction. The stick is held against the wheels by the pivoted guide 76. The movement of the stick to the right and the movement of the engaged wheel surfaces in the opposite direction cooperate to rotate the stick as it passes over the wheels, whereby a good coating of adhesive is applied to the stick near each end thereof.

At about the same time that the stick 81 engages the wheels 89 and 90 the ends of the stick contact the guides 77 and 78, whereby the stick is shifted longitudinally one way or the other if necessary. This operation insures that the stick will be in the proper position transversely of the machine when it reaches the feed rollers 128 and 129 and the shapers 161 and 162.

Before leaving the guide 76 the stick passes under the runners 110 and 111. These runners do not bear down on the stick but serve to guide it beneath the friction layer 98 on the base 97 of weight 96. The stick does not start to spin, therefore, until it reaches the friction layer 98.

During the movement of the stick 81 as described above, the rotation of the cog wheels 125 and 126 has been started by the Geneva movement, and by the time the stick reaches the position in which it is shown in Fig. 9 the ribbons 114 and 115 of coiler cotton have been fed downward and the ends of the ribbons have been seized by the feed rollers 128 and 129.

During the further movement of the stick from the position in which it is shown in Fig. 9 to the position in which it is shown in Fig. 10, the length of cotton 160 has been fed partly through the rollers 128 and 129 and has been broken off from the ribbon 115, the cog wheel 125 having stopped rotating. A similar length of cotton has been fed down and broken off from ribbon 114, but it will be sufficient to consider the length 160 at one end of the stick since the operation at the other end is the same.

The cotton feed is timed relative to the stick movement by the conveyor chains so that when the stick reaches its Fig. 10 position the lower end of the length of cotton 160 has just passed the stick. As the cotton passes through the rollers 128 and 129 it seems to adhere to the rollers slightly and becomes loose and expanded, the individual fibers being fluffed out and separated from each other in a manner which it is difficult to illustrae adequately in the drawing. The stick has started spinning by the time it reaches its Fig. 10 position and the end portion of the stick becomes entangled in the loose fibers at the end of the length of cotton 160 as the stick moves along, carrying the cotton with it to the shaper 161. The fibers naturally tend to adhere to the rough surface of the stick and this tendency is increased by the adhesive which has been applied to the stick.

The spinning motion of the stick is produced by the moving belt 44 as already described. When the stick reaches the shaper 161 the cotton begins to wrap around the stick and is soon formed into a swab by the spinning of the stick and the wiping movement along the shaper. The rough formation of the swab is completed by the time the stick reaches the openings 187 in the shaper, where the swab is wet with starch water. Further movement along the shaper serves to tighten the wrapping of the cotton and plaster down the loose fibers, producing a compact swab having a finished appearance and adhering well to the stick.

It will be understood that a similar swab is formed on the other end of the stick from a length of cotton torn off from ribbon 114. This swab is formed by means of shaper 162 in the same way as described.

Shortly before the stick 81 reaches its Fig. 11 position, or just as it arrives at the shapers, the Geneva movement starts the rotation of the cog wheels 125 and 126 to feed the ribbons 114 and 115 downward to provide cotton for the next stick. Swabs are formed on this stick and the succeeding sticks in the same way as described in the case of stick 81.

After leaving the shapers the stick 81 with the swabs formed thereon is carried along by the conveyor until it reaches the cutter wheel 193, which severs the stick at the center and thus forms two applicators, which are deposited on the conveyor belt 195. This is a slow moving belt which passes the applicators through a dryer (not shown) and thence to a point where they are packed for shipment.

Two applicators made by the machine as described in the foregoing are shown in Fig. 8. Fig. 7 shows a stick 81 having two swabs formed thereon and not yet cut in two.

The machine is also adapted to make applicators such as shown in Fig. 6, which are, however, made one at a time. In order to adapt the machine to make this type of applicator, only one ribbon of coiler cotton is used and the stick cutter is rendered inoperative.

The ribbon 114, for example, may be omitted, and the container 120 may be emptied of adhesive. The starch water valve 183 should also be shut off. The cutter wheel 193 is put out of commission by removing the belt 194 and by raising the shaft 56 far enough so that the sticks will clear the cutter wheel as they pass by. The shaft 56 may be raised by removing the bearing supporting screws such as 197, Fig. 2, and by rotating the bearings about the screws such as 198 as pivots, whereby the shaft 56 is brought to a position above the frame members 17 and 18.

In the manufacture of this type of applicator larger swabs will usually be required. This requirement is taken care of by speeding up the drive for the shaft 127, causing the cog wheels to feed more cotton at each advance, and by adjusting the shapers to a somewhat larger angle with the sticks, as previously mentioned.

It will be understood that the term "cotton" as used herein and in the claims may be taken to mean any suitable fibrous material.

The invention having been described, that which is believed to be new and for which the protection of Letters Patent is desired will be pointed out in the appended claims.

I claim:

1. In a swab making machine, a continuously moving stick conveyor, means for forming two wads of cotton and for applying them to the opposite ends of a stick on said conveyor, means for wrapping said wads around said stick, said last means including a frictional surface and means for rolling said stick over said surface in the direction in which the stick is being moved by the conveyor, said surface engaging the stick between the ends thereof, and means for cutting the stick in two before it leaves said conveyor.

2. In a swab making machine, a stick conveyor comprising two chains, sprocket wheels for supporting and driving said chains, uniformly spaced stick supporting devices included in said chains, a stick reservoir associated with said conveyor, and means comprising notched discs driven in timed relation to said conveyor for extracting sticks from said reservoir and delivering them to said supporting devices.

3. In a swab making machine, a stick conveyor, means for driving said conveyor in continuous uninterrupted advance, means for periodically delivering sticks into a defined position upon said conveyor, means for projecting a mass of fibrous material into the path of a stick on said conveyor while the same is in motion, means including a part moving parallel to but at a higher speed than the conveyor for rotating the stick as it moves along on the conveyor, and means responsive to such rotation of the stick for wrapping said material around the stick to form a swab.

4. In a machine of the class described, a conveyor for supporting a stick at points intermediate the ends thereof, means for operating the conveyor to transport the stick from point to point in the machine, a member located at one side of said conveyor and providing a surface extending parallel to the path of one end of the stick as it is transported on the conveyor, means for inserting a mass of cotton between the said end of the stick and said surface, and means for rotating said stick while the same is moving along said surface to form the mass of cotton into a swab.

5. In a machine of the class described, means for applying a short length of fibrous material to one end of a stick, means providing a stationary surface, means including a conveyor for moving said stick and material along said surface with the said material interposed between the stick and said surface, and stick rotating mechanism effective during said movement of the stick by the conveyor for spinning the stick in the proper direction to produce a wiping rather than a rolling engagement between the said material and said surface, whereby the material is formed into a swab by a combined wrapping and wiping action.

6. A machine as claimed in claim 5, characterized by the provision of means for wetting the swab after the wrapping action is completed and while the wiping action continues, whereby the loose fibers on the exterior of the swab are plastered down.

7. In a swab making machine, a stick rotating mechanism including an endless belt, means for driving said belt, a conveyor for delivering sticks to said belt and for guiding them along a section thereof, said conveyor having means for engaging the sticks at both ends outside the margins of the belt, and means for pressing the sticks against said belt section to enable it to impart rotation to the sticks.

8. In a swab making machine, a member providing a fixed surface, means for rolling a stick along said surface with one end of the stick projecting laterally from said surface, a member providing a second fixed surface adjacent the projecting end of the stick, said second surface being on the opposite side of the stick from said first surface, and means for delivering a wad of cotton to the stick which is formed into a swab by the translation and rotational movement of the stick relative to said second surface.

9. In a swab making machine, a shaper providing a relatively fixed wad forming surface, a conveyor for moving a stick to and along said shaper with the end of the stick projecting over said surface, means for delivering a wad of cotton to the stick at the said end thereof just prior to its reaching the shaper, a member providing a second relatively fixed surface extending parallel to said shaper but on the opposite side of the stick therefrom, means supplementary to the conveyor for rolling the stick along said second surface to produce a rotational motion of the stick as it moves along said shaper to thereby wrap said cotton around the stick and form a swab.

10. A machine as claimed in claim 9, characterized by the provision of stick rolling means including a member moving at such speed that the translational speed of the stick produced by the rolling thereof along the fixed surface is approximately equal to the speed of the conveyor.

11. In a swab making machine, a stick conveyor, means for operating said conveyor to impart continuous movement to sticks to transfer them from one point to another in the machine, means for delivering sticks to said conveyor one at a time, means for supplying a wad of cotton to each stick as it moves along on said conveyor, and wrapping means extending along the path of conveyor travel between said points and operative to start the formation of a swab on each stick while completing the formation of a swab on the preceding stick.

12. In a swab making machine, a stick conveyor and means for operating it, means for periodically delivering sticks to said conveyor, means for supplying a wad of cotton to each stick as it moves along on said conveyor, a shaper past which the sticks and cotton are transported under control of said conveyor in swab forming relation thereto, stick rotating mechanism cooperating with said shaper to wrap each wad of cotton on the associated stick to form a swab, and the length of said shaper being so related to the rate of stick delivery that a plurality of swabs are on the shaper the same time in different stages of formation.

13. In a high speed swab making machine, a device for forming wads of fibrous material, means for moving sticks successively along a path extending to said device, means for operating said device to feed a wad to each stick, mechanism engaging each stick to which a wad is fed and operating to rotate the stick on its longitudinal axis and to simultaneously move it along a continuation of said path extending away from said device, and means operating on said wads during movement of the sticks along the said path continuation to wrap said wads around their associated sticks, respectively, and form swabs.

14. In a swab making machine, means operative to impart a continuous translational motion to a stick along a fixed path in the machine, means for applying adhesive to said stick at one point in said path, means for applying fibrous material to the stick at a second point in said path, means engaging said stick throughout its translational movement from said second point to a third point beyond and effective to continuously rotate said stick on its own axis during its movement between said second and third points, and means operatively engaging said fibrous material during its movement between said second and third points and cooperating with said rotating means to wrap said fibrous material on the stick to form a swab.

15. In a swab making machine, means comprising a stick conveyor adapted to transfer sticks between spaced points in the machine by a continuous forward movement, means for delivering sticks to said conveyor one at a time, means for supplying a wad of cotton to each stick while the stick is in said forward motion, means operative during continuation of said forward movement of each stick to wrap the wad supplied to the stick around it to form a swab, and means for applying adhesive to each stick after it is delivered to the conveyor and before it receives the cotton, said applying means comprising a container for adhesive, a wheel partly submerged in the adhesive and engaged by the sticks as they are moved forward by the conveyor, and means for rotating said wheel in the proper direction to cause the part engaged by the sticks to move against the direction of stick movement.

16. In a swab making machine, a stick conveyor and means for operating it, means for periodically delivering sticks to said conveyor, means for supplying a wad of cotton to each stick as it moves along on said conveyor, a stick rotating device to which the sticks are delivered in spaced relation by said conveyor, means in said rotating device operative to rotate each stick by imparting a rolling motion thereto along a path which is a continuation of the path along which the stick is transported on said conveyor, the distance traveled by each stick in its rolling motion being greater than the spacing between sticks so that there are always at least two sticks undergoing rotation simultaneously, and a shaper cooperating with said device and having substantial length along said continuation path whereby a plurality of sticks and pads are in contact with the shaper and responsive to the rotation of each stick to form the cotton supplied thereto into a swab as the sticks continue their movement on said conveyor.

17. In a swab making machine, mechanism including a continuously forward moving conveyor operative to receive sticks periodically from a reservoir and to convey said sticks by a continuous movement over a fixed path in the machine, said mechanism including means operative along a section of said path to rotate each stick on its longitudinal axis simultaneously with its movement along said section, means for feeding a wad of fibrous material to each stick after its rotation has started, and means providing a swab forming surface extending parallel to said section and with which each rotating stick cooperates during forward movement of the stick to form the wad of material fed thereto into a swab.

18. In a swab making machine, means providing a frictional surface extending along a path for stick travel in the machine, means for periodically supplying sticks to said surface at one end of said path, means engaging each stick so supplied to roll the same along said surface to the other end of said path, means for feeding a wad of fibrous material to each stick approximately as it starts its rolling movement, and means providing a surface in wiping contact with the wad of material on each stick during its rolling movement along said path, whereby each stick wraps the associated material around itself to form a swab.

19. In a machine for making swabs, a stick reservoir, a stick conveyor, means for periodically delivering sticks from said reservoir to said conveyor, means connected to said conveyor for continuous uninterrupted movement thereof along a path through the machine, mechanism for feeding wads of fibrous material to said sticks in their continuous movement along said path, means for spinning the sticks throughout movement thereof along a portion of said path, said spinning means comprising elements disposed along said portion of said path and operatively engaging each stick in its movement, and means cooperating with said spinning means for wrapping said material around said sticks as they advance along said portion of said path whereby to form swabs.

20. In a swab making machine, a stick conveyor having driving connections for uninterrupted forward movement of sticks on the conveyor, means for delivering sticks to said conveyor one at a time, means for supplying a wad of cotton to each stick while the stick is in forward motion with the conveyor, and means positioned for contact with the wad in the continued forward movement of the stick and conveyor to wrap the wad around the stick to form a swab.

21. In a swab making machine, a stick conveying and spinning mechanism comprising means for transporting sticks along a fixed path in the machine and for rotating each stick on its own axis while undergoing transportation along said path, a shaper providing a swab forming surface, said surface having one dimension extending parallel to the path of the sticks and the other dimension conforming to the desired contour of the swabs, means for delivering sticks to said mechanism to be moved along said path in spaced relation and in operative relation to said shaper, and means operated in timed relation to the delivery of said sticks for forming wads of cotton and supplying them to said sticks to be formed into swabs by said shaper responsive to rotation of the sticks by said mechanism, said machine characterized by the provision of means for varying the contour of the cotton wads, said means including a device for adjusting the angle of the shaper with reference to the axis of the sticks, said device comprising mounting means for the shaper having a swingable bracket support.

22. In a swab making machine a stick conveying and spinning mechanism comprising means for transporting sticks along a fixed path in the machine and for rotating each stick on its own axis while undergoing transportion along said path, a shaper providing a swab forming surface, said surface having one dimension extending parallel to the path of the sticks and the other dimensions conforming to the desired contour of the swabs, means for delivering sticks to said mechanism to be moved along said path in spaced relation and in operative relation to said shaper, and means operated in timed relation to the delivery of said sticks for forming wads of cotton and supplying them to said sticks to be formed into swabs by said shaper responsive to rotation of the sticks by said mechanism, the position of the shaper relative to the sticks as swabs are being formed thereon being such that the speed relation between the swab forming surface and that part of the surface of a partly formed swab which is in contact therewith is a function of the sum of the rotational speed of the stick and the speed of the stick movement along said path.

References Cited in the file of this patent
UNITED STATES PATENTS

| | | |
|---|---|---|
| 1,497,576 | Molins | June 10, 1924 |
| 1,721,815 | Gerstenzang | July 23, 1929 |
| 1,755,109 | Fortier | Apr. 15, 1930 |
| 1,921,604 | Bunnell et al. | Aug. 8, 1933 |
| 2,228,599 | Glickston | Jan. 14, 1941 |
| 2,253,852 | Glickston | Aug. 26, 1941 |
| 2,430,648 | Schonrock | Nov. 11, 1947 |
| 2,557,024 | Barber et al. | June 12, 1951 |